United States Patent
Choi et al.

(10) Patent No.: US 11,836,926 B2
(45) Date of Patent: Dec. 5, 2023

(54) SYSTEM AND METHOD FOR CONTOURING A SET OF MEDICAL IMAGES BASED ON DEEP LEARNING ALGORITHM AND ANATOMICAL PROPERTIES

(71) Applicant: INFINITT HEALTHCARE CO., LTD., Seoul (KR)

(72) Inventors: Wonhoon Choi, Seoul (KR); Sang Wook Cho, Seoul (KR); Han Young Kim, Seoul (KR)

(73) Assignee: INFINITT HEALTHCARE CO., LTD., Seoul (KR)

( * ) Notice: Subject to any disclaimer, the term of this patent is extended or adjusted under 35 U.S.C. 154(b) by 160 days.

(21) Appl. No.: 17/153,174

(22) Filed: Jan. 20, 2021

(65) Prior Publication Data
US 2022/0198674 A1    Jun. 23, 2022

(30) Foreign Application Priority Data
Dec. 21, 2020    (KR) .................. 10-2020-0180306

(51) Int. Cl.
*G06T 7/12*    (2017.01)
*G06T 7/00*    (2017.01)

(52) U.S. Cl.
CPC .............. *G06T 7/12* (2017.01); *G06T 7/0012* (2013.01); *G06T 2200/24* (2013.01); *G06T 2207/20104* (2013.01)

(58) Field of Classification Search
None
See application file for complete search history.

(56) References Cited

U.S. PATENT DOCUMENTS

| | | | |
|---|---|---|---|
| 7,773,786 B2 | 8/2010 | Fidrich et al. | |
| 8,805,035 B2 | 8/2014 | Piper | |
| 8,867,806 B2 | 10/2014 | Hibbard | |
| 9,792,525 B2* | 10/2017 | Piper | G06T 7/12 |
| 10,453,199 B2 | 10/2019 | Weistrand | |
| 10,599,948 B2 | 3/2020 | Piper | |

(Continued)

FOREIGN PATENT DOCUMENTS

| | | |
|---|---|---|
| EP | 3 111 422 B1 | 1/2017 |
| KR | 10-1404345 B1 | 6/2014 |
| WO | 2007/036887 A1 | 4/2007 |

*Primary Examiner* — Nancy Bitar
(74) *Attorney, Agent, or Firm* — United One Law Group LLC; Kongsik Kim; Jhongwoo Peck

(57) ABSTRACT

Disclosed herein are a system and method for contouring a set of medical images. The system for contouring a set of medical images receives a medical image set including a plurality of medical images via the communication interface module, receives region-of-interest (ROI) information as an object for the drawing of a contour via the user interface module, checks whether a contour corresponding to the ROI information has been drawn on a target image currently displayed to a user, predicts a contour candidate based on contouring conditions if the contour corresponding to the ROI information has not been drawn on the target image, and displays the contour candidate on the target image. The contouring conditions include the relevance between at least one source image, on which the contour corresponding to the ROI information has been already drawn, and the target image, and anatomical information related to the ROI information.

13 Claims, 3 Drawing Sheets

(56) References Cited

U.S. PATENT DOCUMENTS

| | | | |
|---|---|---|---|
| 11,455,730 B2* | 9/2022 | Furukawa | G06T 7/11 |
| 11,475,666 B2* | 10/2022 | Shi | G06K 9/6292 |
| 2019/0012567 A1* | 1/2019 | Piper | G06T 7/12 |
| 2019/0251694 A1 | 8/2019 | Han et al. | |
| 2020/0380675 A1* | 12/2020 | Golden | G16H 50/70 |

* cited by examiner

SYSTEM AND METHOD FOR CONTOURING A SET OF MEDICAL IMAGES BASED ON DEEP LEARNING ALGORITHM AND ANATOMICAL PROPERTIES

CROSS-REFERENCE TO RELATED APPLICATION

This application claims the benefit of Korean Patent Application No. 10-2020-0180306 filed on Dec. 21, 2020, which is hereby incorporated by reference herein in its entirety.

BACKGROUND

1. Technical Field

The present invention relates to technology regarding medical image processing, and more particularly to technology for advancing the contouring of medical images and improving practical applicability.

2. Description of the Related Art

In general, contouring is the process of extracting the contour of an object of interest from an image, and is widely used in the field of image processing because an object can be represented concisely and easily to analyze. In the field of medical image processing, contouring can be used for diagnosis, treatment, and prognosis after treatment by using diagnostic images such as computed tomography (CT) images or magnetic resonance (MR) images acquired from patients.

An application in which contouring has considerable significance is image-guided radiation therapy (IGRT). IGRT is a method of irradiating only a tumor area while protecting normal tissue around the tumor as much as possible by planning the location and extent of irradiation using diagnostic images before radiation treatment. For this purpose, it is necessary to input the contour information of normal organs and distinguish between a tumor region and the normal organs.

This contouring process is manually performed by a medical professional in the medical field. Due to the recent development of diagnostic imaging apparatuses, the amount of data in medical images is enormous, and thus the manual contouring performed by a medical professional requires a lot of time, with the result that automatic and semi-automatic contouring is performed. However, a problem arises in that there occurs a difference between the actual boundary of a human organ to be contoured and a contour required by a user.

The difference between a contouring result required by a medical professional and a contouring result obtained automatically or semi-automatically is basically due to two factors. Since a medical professional takes into consideration the purpose of use of a contouring result, he or she often prefers a method of drawing the contour of an organ in a form suitable for the protection or treatment of the organ rather than extracting complex and accurate boundaries of the organ.

Another factor is that automatic or semi-automatic contouring basically relies on segmentation based on the brightness values of medical images. In this case, a problem arises in that adjacent organs or objects cannot be clearly distinguished from each other when the brightness values of the adjacent organs are similar or when the boundaries between objects are discontinuous due to the influence of noise.

Conventional techniques applied to automatic or semi-automatic contouring in the field of medical image processing can be basically classified into an edge-based method, a shape-based method, and a deformable model method.

The edge-based technique is a technique for recognizing pixels having a difference in brightness from surrounding pixels in an image as outlines/contours, and has a limitation in that it cannot perform accurate contouring when the boundary of an object is discontinuous or when there is a surrounding background having similar brightness values.

The shape-based technique is a technique for performing contouring using previously recognized anatomical shape information. Although it offers relatively high accuracy, it suffers from the burden of constructing a statistical shape model. When changes in the shape of an object to be contoured are various, accuracy is affected by the level of construction of the statistical shape model.

Another example of the shape-based technique is disclosed in U.S. Patent Application Publication No. 2019/0251694 entitled "Atlas-based Segmentation Using Deep-Learning." The invention disclosed in U.S. Patent Application Publication No. 2019/0251694 is intended to solve the process of registering an atlas image, which is a representative shape, to a target image in order to identify an anatomical structure in a subject image with the help of a deep learning technique.

The deformable model technique is a method that is actively applied in the field of computer vision in recent years. In the case of the Chan-Vese model, which is a geometric model, an area is extracted using the similarity between the brightness value signal distributions of regions inside and outside an outline/contour. The deformable model technique has a limitation in that an incorrect object is extracted by setting a background area other than an object as an initial outline/contour when an area having a brightness value similar to that of the object is present around the object.

Another example of the deformable model technique is disclosed in U.S. Pat. No. 9,792,525 entitled "Systems and Methods for Contouring a Set of Medical Images." The invention disclosed in U.S. Pat. No. 9,792,525 is configured to generate deformable field data between a source image on which a contour has been already drawn and a target image on which a contour will be drawn and automatically or semi-automatically generate contours by applying a deformable image registration technique.

Korean Patent No. 10-1404345 entitled "Object Automatic Contouring System for Diagnostic Image and Contouring Method Therefor" discloses contouring technology in which the shape-based technique and the deformable model technique are combined together in such a manner as to register an area inside a contour by incorporating shape prior knowledge into an area where a similar brightness value is present around an object, which corresponds to a condition in which the deformable model technique is weak.

However, the technologies of these prior art documents have a problem in that they are not frequently used in the actual medical field because they require a long time and a lot of resources (e.g., a lot of memory and computing power) in the process of generating contours and still provide results that fall short of contouring results required in the medical field.

SUMMARY

The conventional technologies disclosed in the foregoing prior art documents, i.e., U.S. Pat. No. 9,792,525 entitled "Systems and Methods for Contouring a Set of Medical Images" and Korean Patent No. 10-1404345 entitled "Object Automatic Contouring System for Diagnostic Image and Contouring Method Therefor," have achieved considerable performance at the laboratory level, but still fall short of the requirements of the medical field.

Although the conventional contouring technologies can automatically or semi-automatically contour slices over the overall range of medical images, these results do not meet the intended purpose of healthcare professionals in the medical field, and thus the fully automatic contouring technology is still not preferred in the medical field.

When the specificity of the medical field is taken into consideration, it is highly likely that a technology that provides an organ contour in a slice, requiring the drawing of a new contour, based on a slice on which a contour already confirmed by a user has been drawn will be adopted in the medical field.

The present invention has been conceived to overcome the above-described problems of the prior art and the above-described conventional technologies, and an object of the present invention is to propose technology that, in the process of entirely or partially contouring a specific anatomical organ according to an automatic or semi-automated procedure, preliminarily draws the contour of the specific anatomical organ on a slice, requiring the drawing of a new contour, based on a slice on which a contour has already been drawn.

This process is referred to as "contour prediction." An object of the present invention is to provide a contour more suitable for a user's purpose in contour prediction by taking into consideration the anatomical properties of an organ.

An object of the present invention is to support the proposal of a new contour candidate according to the properties of each organ in response to a request for modification from a medical professional that inevitably occurs in the existing fully automated system.

An object of the present invention is to minimize loading for computation during contour prediction and rapidly propose a contour candidate in response to a request from a user.

According to an aspect of the present invention, there is provided a system for contouring a set of medical images, the system including at least one processor, a user interface module, and a communication interface module. The at least one processor is further configured to: receive a medical image set including a plurality of medical images via the communication interface module; receive region-of-interest (ROI) information as an object for the drawing of a contour via the user interface module; check whether a contour corresponding to the ROI information has been drawn on a target image currently displayed to a user; predict a contour candidate based on contouring conditions if the contour corresponding to the ROI information has not been drawn on the target image; and display the contour candidate on the target image. The contouring conditions include: the relevance between at least one source image, on which the contour corresponding to the ROI information has been already drawn, and the target image; and anatomical information related to the ROI information.

The anatomical information may include at least one of a physical property and a biological property related to the ROI information. An example of the physical property may be the elasticity of ROI organ tissue.

The anatomical information may be determined based on at least one of the user, the ROI information, the gender of a patient, the age of the patient, the disease history of the patient, and the treatment history of the patient.

The anatomical information may include a contouring parameter related to a constraint for deriving the contour candidate from the contour on the at least one source image. In this case, the contouring parameter may be based on a concept defined based on a role that the anatomical information contributes to a contouring process.

The at least one processor may be further configured to map the ROI information, received via the user interface module, to any one of predetermined anatomical groups based on natural language processing of the ROI information.

The at least one processor may be further configured to predict the contour candidate by applying the contouring parameter determined based on the classification of a first anatomical group to which the received ROI information is mapped.

The at least one processor may be further configured to derive a pattern of contouring parameters applied according to the ROI information for each user by analyzing a pattern of contour candidates approved by the user. The at least one processor may be further configured to predict a new contour candidate for a new target image by applying the pattern of contouring parameters, applied according to the ROI information for each user, to the new target image.

The at least one processor may be further configured to detect a contouring aid request event for the prediction of the contour candidate via the user interface module. In this case, the relevance between at least one source image, on which the contour corresponding to the ROI information has been already drawn, and the target image may be determined based on the type of contouring aid request event.

The at least one processor may be further configured to provide a subsequent sequence, pre-designated for the contour candidate, to the user. In this case, the at least one processor may be further configured to approve the contour candidate upon receiving pre-designated feedback on the subsequent sequence from the user.

According to another aspect of the present invention, there is provided a method for contouring a set of medical images, the method including: receiving, by at least one processor, medical image set including a plurality of medical images via a communication interface module; receiving, by the at least one processor, region-of-interest (ROI) information as an object for the drawing of a contour via a user interface module; checking, by the at least one processor, whether a contour corresponding to the ROI information has been drawn on a target image currently displayed to a user; predicting, by the at least one processor, a contour candidate based on contouring conditions if the contour corresponding to the ROI information has not been drawn on the target image; and displaying, by the at least one processor, the contour candidate on the target image.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Other objects and features of the present invention in addition to the above-described objects will be apparent from the following description of embodiments taken with reference to the accompanying drawings.

Embodiments of the present invention will be described in detail below with reference to the accompanying drawings. In the following description, when it is determined that a detailed description of a related known component or function may unnecessarily make the gist of the present invention obscure, it will be omitted.

Among the components of the present invention, the components known to those skilled in the art prior to the filing of the present application will be described as parts of the configuration of the present invention in this specification as necessary, but the descriptions thereof may be omitted when it is considered that the descriptions of the items obvious to those skilled in the art may make the spirit of the invention obscure. In addition, for the items omitted in the present specification, the descriptions thereof may be replaced by notifying that they are known to those skilled in the art through prior art documents, such as U.S. Pat. No. 9,792,525 entitled "Systems and Methods for Contouring a Set of Medical Images," Korean Patent No. 10-1404345 entitled "Object Automatic Contouring System for Diagnostic Image and Contouring Method Therefor," and U.S. Patent Application Publication No. 2019/0251694 entitled "Atlas-based Segmentation Using Deep-Learning," cited therein.

Some of the items disclosed by these prior art documents are related to the problem to be solved by the present invention, and some of the solutions adopted by the present invention may be also applied to these prior art documents.

In the following description given in conjunction with FIGS. 1 to 3, descriptions of the items considered to be well-known technologies in the art to which the present invention pertains may be omitted as needed or may be replaced by citing prior art documents in order to prevent the gist of the present invention from being obscured.

Furthermore, some or all of the components of the prior art documents cited above and the prior art documents to be cited later are related to the problem to be solved by the present invention, and some of the solutions adopted by the present invention may be borrowed from the prior art documents.

Among the components disclosed in the prior art documents, only the items also included in order to specify the present invention will be considered to be parts of the configuration of the present invention. In this case, among the components disclosed in the prior art documents, only the components not contrary to the object of the present invention may be considered to be parts of the configuration of the present invention.

Details of the present invention will be described below through the embodiments of FIGS. 1 to 3.

Figure 1:
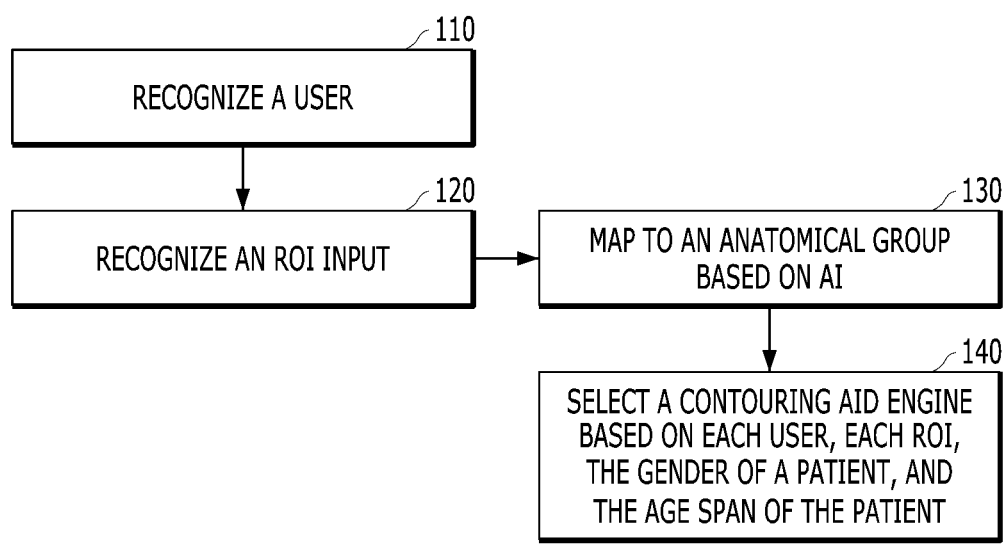
FIG. 1 is a diagram showing a workflow up to the selection of a contouring aid engine in a system for contouring a set of medical images according to an embodiment of the present invention.

FIG. 1 is a diagram showing a workflow up to the selection of a contouring aid engine in a system for contouring a set of medical images according to an embodiment of the present invention.

At least one processor of the system for contouring a set of medical images may allow a user to log in and recognize the user via a user interface module in block 110.

The user is a medical professional, and may be one of a clinician, a radiologist, and a medical technical staff member. Since the behavior expected in a medical image contouring process varies depending on the role of a user, the process of recognizing the user may function as an important factor in increasing the satisfaction of the user with a contour candidate provided as a result of medical image contouring.

The at least one processor of the system for contouring a set of medical images may recognize region-of-interest (ROI) information via the user interface module in block 120. The ROI information is a contouring target object, and may refer to an organ.

In workflows at medical sites, it is common to draw a contour for one organ in a continuous sequence for an overall medical image set and then draw a contour for another organ in a continuous sequence for the overall medical image set. In particular, in the case of image-guided radiation therapy (IGRT), a contour for a tumor that is the target of radiation treatment and a contour for each of the other normal organs adjacent to the tumor need to be drawn such that a plan for radiation therapy can be made to protect the normal organs and destroy the tumor. Accordingly, it is necessary to draw all contours for many types of organs.

In this case, a medical staff member inputs the ROI information via a user interface. The ROI information recognized via the user interface may be information input by a medical staff member who is a user. In this case, even the same organ may be expressed differently depending on each medical staff member. In particular, an abbreviation that is frequently used at medical sites causes difficulty in the system recognizing the input of ROI information for an organ as the input for the same anatomical object.

In this case, there may be applied a technology for recognizing various expressions of the same organ, input by humans, by using a type of natural language processing technique and determining that the same anatomical object is substantially expressed for different expressions. In the system for contouring a set of medical images according to the present invention, ROI information input via the user interface may be analyzed and mapped to a predetermined anatomical group in block 130.

For example, the left and right lungs need to be anatomically classified into different objects. Depending on the user, the "left" may be described in various expressions such as Left, Lt, LT, and L, and the "right" may be described in various expressions such as Right, Rt, RT, and R.

Although it is difficult to identify an organ, targeted by an input, by using only the expression "left" or "right," it is relatively easy to identify the organ if the above expression is input in combination with the term referring to the organ "lung." For example, expressions such as Left Lung, Lung Left, Lt Lung, Lung Lt, and L Lung may be recognized as the left lung.

This example can also be applied to the kidneys. Although expressions meaning the left kidney may be made by users in various forms such as Lt Kidney, Kidney L, and Kid L, these expressions can be clinically understood as the same anatomical object.

The at least one processor of the system for contouring a set of medical images according to the present invention may map the input ROI information to one of predetermined anatomical groups through natural language processing. In this case, natural language processing is a technique capable of recognizing various expressions that many people make about the same organ, grouping them together, and identifying them as expressions for the same anatomical organ. For natural language processing, a deep learning technique, which has recently attracted attention, may be applied, thereby widening the range of pattern recognition and improving the speed of mapping operations.

The mapped anatomical group may function as more refined ROI information for the input ROI information. In the following process, it is assumed that the system for contouring a set of medical images according to the present invention performs the contouring of medical images using the refined ROI information.

The at least one processor of the system for contouring a set of medical images according to the present invention may select a contouring aid engine distinct for each user by taking into consideration the mapped anatomical group in block 140. In this case, the at least one processor of the system for contouring a set of medical images according to the present invention may select a contouring aid engine distinct for each piece of ROI information. Furthermore, the at least one processor of the system for contouring a set of medical images according to the present invention may select a contouring aid engine distinct for the gender of a patient and the age span of the patient.

In other words, the contouring aid engine may obtain a different contouring effect by applying a different physical property or contouring parameter based on at least one of a user, ROI information, the gender of a patient, and the age of the patient.

Conventional automatic or semi-automatic contouring techniques basically apply an image segmentation technique in order to extract the boundary of a specific anatomical organ from a medical image. In this case, the most commonly applied image segmentation technique is a boundary-based technique that recognizes pixels having a difference in brightness from neighboring pixels as edges or boundaries and distinguishes objects. However, when the boundary of an object is discontinuous or a surrounding background having a similar brightness value is present, this boundary-based technique does not accurately segment the object and, thus, cannot provide an accurate contour result.

In response to this, technologies for performing registration between a source image and a target image to increase the completeness of the contour and attempting the contouring of the target image using a deformable image field derived from the registration are disclosed in the prior art document U.S. Pat. No. 9,792,525 entitled "Systems and Methods for Contouring a Set of Medical Images," etc.

However, in the prior art document U.S. Pat. No. 9,792,525 entitled "Systems and Methods for Contouring a Set of Medical Images," the calculation of the deformable image field or a deformable registration field needs to be determined in advance, so that the amount of computation is large and computational load is heavy.

Furthermore, in the prior art document U.S. Pat. No. 9,792,525 entitled "Systems and Methods for Contouring a Set of Medical Images," the properties of each organ are not taken into consideration, so that it is difficult to provide an optimized result for each anatomical organ.

Moreover, in the prior art document U.S. Pat. No. 9,792,525 entitled "Systems and Methods for Contouring a Set of Medical Images," the deformable registration field is repeatedly calculated without considering the properties of each organ, so that there is little prospect of improvement in accuracy even when actual usage examples are accumulated.

A shape-based technique using an atlas, which is a standard organ model derived in advance for each anatomical organ, may be optimized for each anatomical organ and provide relatively accurate contour results compared to the deformation model technique.

However, the method of registering an atlas to a target image and extracting contour information corresponding to the atlas from the target image requires a large amount of computation. In other words, although this method is attracting a lot of academic interest, it is difficult to apply the method at medical sites. In order to reduce the amount of computation of such Atlas-based Auto-Segmentation (ABAS) and improve speed, an attempt to deal with a process of registration between a target image and an atlas image by using a deep learning technique is disclosed in U.S. Patent Application Publication No. 2019/0251694 entitled "Atlas-based Segmentation using Deep-Learning."

However, even when this method is applied, the atlas-based contouring technique still requires high large computing power and large memory usage, and it is difficult to meet the needs of the medical field within a short period of time.

In the above-described Korean Patent No. 10-1404345 entitled "Object Automatic Contouring System for Diagnostic Image and Contouring Method Therefor," an attempt is made to improve performance by combining a deformation model method and a pre-shape based method. Korean Patent No. 10-1404345 proposes a hybrid technique that reflects atlas information in a condition in which it is difficult for the transform model technique to produce excellent results.

However, since atlas information is still used, high computing power and large memory usage are required, and it is difficult to meet the needs of the medical field within a short period of time.

In particular, in the case of the prior art using atlas information, a problem arises in that it is difficult to completely solve the requirements of a medical professional in Image-Guided Radiation Therapy (IGRT), which is the main target application of the present invention. In IGRT, contouring is also required for normal organs in order to protect the normal organs, but contouring is also required for a tumor in order to treat the tumor.

However, the atlas is generally a standard organ model based on statistics for normal organs, and tumors are significantly diverse in shape, so that it is very difficult to standardize the shapes of tumors based on statistics.

Accordingly, the conventional techniques using atlas information may be effective for the contouring of normal organs, but are problematic in that it is difficult to deal with the contouring of organs accompanied by tumors or diseases.

In other words, in the prior art, an atlas, which is a standard organ model derived based on statistics for each organ, is frequently applied. However, computation using such an atlas has disadvantages that high computing power and large memory load are required. In addition, since the atlas is a model derived for normal organs, it is often not appropriate for organs of patients having tumors or diseases.

In the system for contouring a set of medical images according to the present invention, anatomical information may be applied differently in response to refined ROI information.

The system for contouring a set of medical images according to the present invention is intended to propose anatomical information other than the atlas and to propose a technology that improves the completeness of contouring results by using physical properties, mechanical properties, and biological properties, which cannot be provided by the atlas, for contouring.

Since the atlas only provides standard types of organs, there are not many suggestions about the physical or biological properties of a corresponding organ. However, the organs of patients having tumors or diseases are severely deformed frequently, unlike normal tissues.

Therefore, at medical sites, the contouring technique is not performed entirely based on the atlas. In a plurality of medical image sets, for example, a contour approved for one slice image by a medical professional may be applied as a criterion for deriving a contour candidate from a subsequent slice image.

When a slice image that has already been approved for a contour by a medical professional and has been drawn is referred to as a source image, a subsequent slice image for which a contour needs to be drawn may be referred to as a target image.

In the case of deriving the contour candidate of the target image from the contour of the source image, when simply relying on brightness values or a deformable image field, as in the prior art, contouring results that are not consistent with the common sense of a medical professional are frequently derived.

When deriving the contour candidate of a target image from the contour of a source image, the system for contouring a set of medical images according to the present invention may predict a contour candidate such that a difference in an axial plane between the contour of the source image and the contour candidate of the target image, i.e., an adjacent slice, is given within predetermined constraints. These constraints may be understood as the role that anatomical information contributes in the contouring process.

For example, when the interval between adjacent slice images is 0.5 mm, a deformable constraint between the contours of adjacent slices may be determined by taking into consideration the elasticity of a corresponding organ (ROI information). Physical properties or mechanical properties may include, e.g., elasticity, and deformable stiffness to external force attributable to the weight of an adjacent organ may be taken into consideration.

Anatomical information including such physical properties, mechanical properties, or biological properties may be affected by at least one of a user, ROI information (the type of organ), the gender of a patient, and the age of the patient, as described above.

In other words, the degree to which an organ can be deformed may vary depending on the age of a patient, and the proportions of body composition may vary depending on the gender of a patient, so that these may also affect the degree to which the organ can be deformed.

Furthermore, anatomical information acting as a contouring constraint may be affected by the disease history of a patient and the treatment/dosing history of the patient. For example, after radiation therapy for liver disease has been received, the liver may harden and anatomical information may be affected.

For example, when a contour candidate is predicted by comparing the brightness values of computed tomography (CT) images, there are frequent cases where a boundary that is naturally recognized based on the naked eye and medical expertise of a medical professional cannot be derived naturally by a deformable field based on the simple repetitive computation of a machine.

In this case, a contour result more consistent with the medical expertise of a medical professional may be derived by replacing or supplementing the deformable field based on the simple repetitive computation of a machine with anatomical information including physical properties, mechanical properties, or biological properties. In this case, the anatomical information may have a role as a constraint on deformation between the contours of adjacent slices.

These constraints may be given as a contouring parameter set. The contouring parameter set may be applied differently because the physical and/or biological properties of tissue vary depending on each organ.

Meanwhile, the system for contouring a set of medical images according to the present invention may acquire ROI information based on the input of a user, and may acquire patient identification information and patient data based on the DICOM header of a medical image. The patient data may include the gender of a patient, the age of the patient, the disease history of the patient, and treatment/dosing history of the patient. If DICOM header alone is insufficient, additional information may be obtained from a comprehensive hospital information system (HIS) or clinical information system (CIS).

The system for contouring a set of medical images according to the present invention may predict a contour candidate by applying contouring parameters determined based on the classification of a first anatomical group to which ROI information is mapped. In other words, there may be applied contouring parameters that vary depending on the result of the classification of an anatomical group.

The system for contouring a set of medical images according to the present invention may extract the pattern and trend of contour candidates approved by each user for the user through user management. The system may derive the pattern of contouring parameters that are differently applied according to ROI information for each user.

The system may extract the trend and pattern of the application of contouring parameters for each user by analyzing whether contour candidates have been approved for each user and the pattern and trend of the modification of contour candidates when the contour candidates have not been approved through user management.

The system may extract the trend and pattern of the application of contouring parameters based on each gender of patients by analyzing whether contour candidates have been approved by users and the pattern and trend of the modification of contour candidates when the contour candidates have not been approved based on each gender of patients.

The system may extract the trend and pattern of the application of contouring parameters based on each age of patients by analyzing whether contour candidates have been approved by users and the pattern and trend of the modification of contour candidates when the contour candidates have not been approved based on each age of patients.

Figure 2:
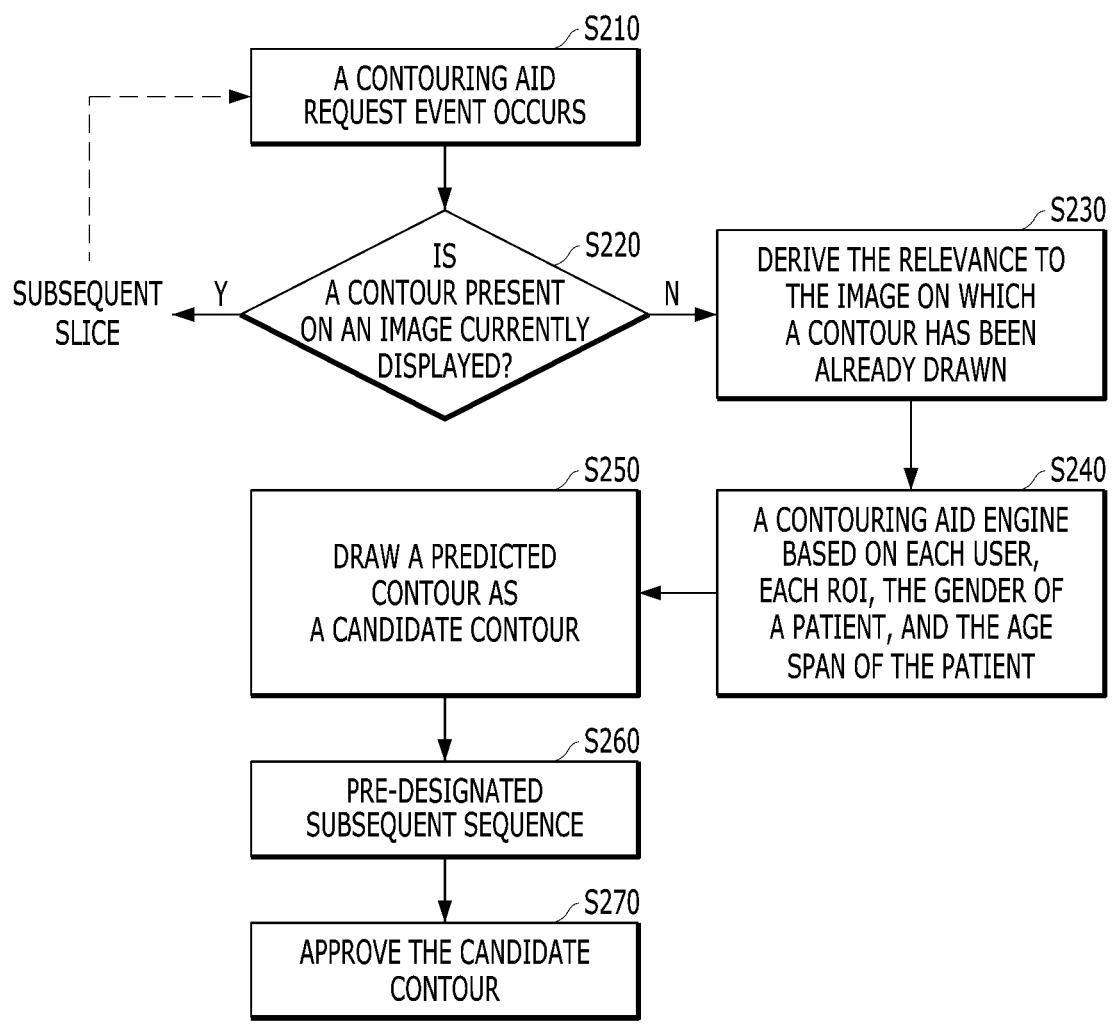
FIG. 2 is a diagram showing the workflow of predicting a contour candidate in a system for contouring a set of medical images according to an embodiment of the present invention.

FIG. 2 is a diagram showing the workflow of predicting a contour candidate in a system for contouring a set of medical images according to an embodiment of the present invention.

Referring to FIG. 2, the at least one processor of the system for contouring a set of medical images according to the present invention may detect whether a contouring aid request event has been received from a user via the user interface module at step S210.

The contouring aid request event may be detected when a subsequent slice image is requested or when interpolation or extrapolation is requested.

The contouring aid request event may determine a positional relationship and relevance between a source image and a target image. For example, when a subsequent slice image is requested, there is determined a relationship in which the target image is the subsequent slice image adjacent to the source image.

For example, when contours have been drawn from a contour for a 20th slice to a contour for a 30th slice among 50 slices and a contour before a contour for a 20th slice or after a 30th slice is to be drawn, this is classified as a case of extrapolation.

For example, when contours have been drawn for most of 50 slices and contours for some intermediate slices are missing, this is classified as a case of interpolation.

When a plurality of source images are present, the contour of one source image adjacent to a target image may be applied as a reference contour pattern for deriving contour candidates of the target image. Alternatively, the contours of a plurality of source images may be applied. The contours of a plurality of source images may be applied to the process of predicting a contour candidate of a target image through interpolation, extrapolation, or interpolation or extrapolation operation based on weights according to the type of event.

The at least one processor of the system for contouring a set of medical images according to the present invention may check whether a contour corresponding to the ROI information has been drawn on a target image currently displayed to the user at step S220. As described above, there frequently occurs a workflow in which contours are sequentially drawn for all slices for one organ and contours are sequentially drawn for all slices for a subsequent organ, so that the contouring process of the present invention is started in the case where a contour for another organ in the target image may have been drawn and a contour corresponding to the ROI information, which is the object of current contouring, is not drawn.

The at least one processor of the system for contouring a set of medical images according to the present invention may derive a positional relationship and relevance between the target image and the source image at step S230. In this case, the positional relationship and the relevance may be determined based on the type of contouring aid request event, as described above.

The at least one processor of the system for contouring a set of medical images according to the present invention may predict a contour candidate in cooperation with the contouring aid engine at step S240.

The contouring aid engine may be classified and optimized based on at least one of the user, the ROI information, the gender of the patient, the age of the patient, the disease history of the patient, and the treatment/dosing history of the patient.

The at least one processor of the system for contouring a set of medical images according to the present invention may draw the predicted contour candidate on the target image at step S250.

The at least one processor of the system for contouring a set of medical images according to the present invention may provide the user with a subsequent sequence predesignated for the contour candidate at step S260. In this case, the subsequent sequence may be a menu asking whether the user will approve the contour candidate.

The at least one processor of the system for contouring a set of medical images according to the present invention may approve the contour candidate based on user feedback corresponding to the subsequent sequence at step S270.

According to an embodiment of the present invention, the subsequent sequence and the contour candidate approval process may be performed by a menu that explicitly asks the user whether to approve the contour candidate, and the user may provide feedback on whether to approve the contour candidate by a predetermined operation (a left click of a mouse=approval, a right click thereof=rejection) with respect to the contour candidate.

The history of whether the user has approved the contour candidate may be learned online by the system, and may be used to adjust contouring parameters that are applied differently for each user, the gender of a patient, and the age of the patient.

After the user has rejected the contour candidate, a menu adapted to allow the user to redraw a contour or correct the contour candidate may be provided. In this case, a result obtained when the user redraws the contour or modifies the contour candidate may also be learned online, and may be used to adjust contouring parameters that are applied differently for each user, the gender of a patient, and the age of the patient.

Figure 3:
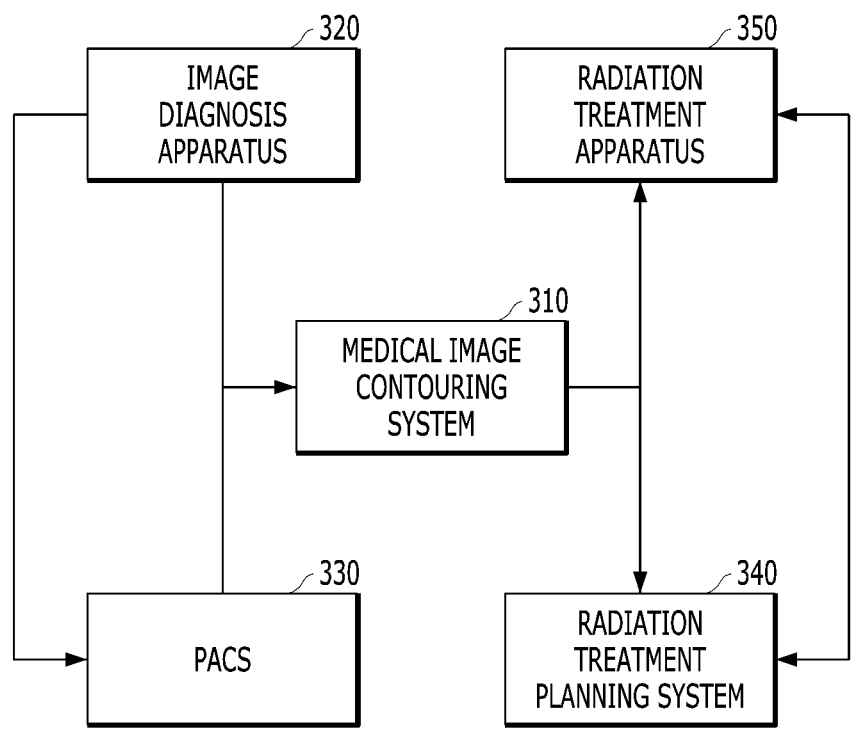
FIG. 3 shows relationships between a system for contouring a set of medical images according to an embodiment of the present invention and peripheral apparatuses.

FIG. 3 shows relationships between a system for contouring a set of medical images according to an embodiment of the present invention and peripheral apparatuses.

A medical image contouring system 310 may receive a medical image set from an image diagnosis apparatus 320 or a picture archiving and communication system (PACS) 330. The image diagnosis apparatus 320 refers to a modality capable of acquiring a medical image of an anatomical structure inside a human body, such as an ultrasound imaging scanner, a computed tomography (CT) scanner, or a magnetic resonance imaging (MRI) scanner.

The medical image set acquired by the image diagnosis apparatus 320 may be directly transmitted to the medical image contouring system 310, or may be stored in the PACS 330 and then transmitted from the PACS 330 to the medical image contouring system 310.

The contouring results derived by the medical image contouring system 310 may be transferred to a radiation treatment planning system 340 and/or a radiation treatment apparatus 350 as contour information for the medical image set through the approval of a user.

The medical image contouring system 310 may include at least one processor, memory, storage, a user interface module, and/or a communication interface module therein. The contouring system 310 corresponds to, e.g., a computing system (not shown), and the computing system may include at least one processor, memory, storage, a database, a user interface module, and/or a communication interface module. The following operations and functions are performed by the processor in the computing system, and the processor may perform the following operations and functions in cooperation with at least one of the memory, the storage, the database, the user interface module, and/or the communication interface module.

The main components and functions of the present invention may be provided to medical sites in the form of computer-readable program instructions, and the medical image contouring service and/or method according to the present invention may be provided to a user in such a manner that the program instructions are stored or loaded and then executed by the at least one processor and/or the memory.

Detailed descriptions of the configuration in which the main components and functions of the present invention are performed by a computing system including a processor, memory, storage, a database, a user interface module, and/or a communication interface module and implemented by program instructions may be applied for the implementation of the present invention by being borrowed by a person skilled in the art within the scope suitable for the purpose of the present invention from the foregoing prior art documents, e.g., U.S. Pat. No. 9,792,525 entitled "Systems and Methods for Contouring a Set of Medical Images," Korean Patent No. 10-1404345 entitled "Object Automatic Contouring System for Diagnostic Image and Contouring Method Therefor," and U.S. Patent Application Publication No. 2019/0251694 entitled "Atlas-based Segmentation Using Deep-Learning." Since it is determined that more detailed descriptions thereof may make the gist of the present invention obscure, they are replaced by citing these foregoing prior art documents.

The method according to an embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

According to the present invention, in the process of entirely or partially contouring a specific anatomical organ according to an automatic or semi-automated procedure, the contour of the specific anatomical organ may be preliminarily drawn on a slice, requiring the drawing of a new contour, based on a slice on which a contour has already been drawn.

According to the present invention, a contour more suitable for a user's purpose may be provided in contour prediction by taking into consideration the anatomical properties of an organ.

According to the present invention, the proposal of a new contour candidate according to the properties of each organ may be supported in response to a request for modification from a medical professional that inevitably occurs in the existing fully automated system.

According to the present invention, loading for computation may be minimized during contour prediction, and a contour candidate may be rapidly proposed in response to a request from a user.

Although the present invention has been described with reference to specific details such as the specific components, and the limited embodiments and drawings, these are provided merely to help a general understanding of the present invention, and the present invention is not limited thereto. Furthermore, those having ordinary skill in the technical field to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

What is claimed is:

1. A system for contouring a set of medical images, the system comprising:
   at least one processor;
   a user interface; and
   a communication interface,
   wherein the at least one processor is configured to:
      receive a medical image set including a plurality of medical images via the communication interface;
      receive region-of-interest (ROI) information as an object for drawing of a contour via the user interface;
      check whether a contour corresponding to the ROI information has been drawn on a target image currently displayed to a user;
      predict a contour candidate in the target image if the contour corresponding to the ROI information has not been drawn on the target image; and
      display the contour candidate on the target image,
   wherein the contour candidate is predicted based on a relevance between a source image, on which a first contour corresponding to the ROI information has been already drawn, and the target image,
   wherein the contour candidate is predicted such that a deformation of the contour candidate from the first contour has been constrained based on anatomical information related to the ROI information, and
   wherein the deformation of the contour candidate from the first contour has been constrained based on a mechanical deformable property related to an anatomical classification of the ROI information.

2. The system of claim 1, wherein the anatomical information is determined based on at least one of the user, the ROI information, a gender of a patient, an age of the patient, a disease history of the patient, and a treatment history of the patient.

3. The system of claim 1, wherein the anatomical information comprises a contouring parameter related to a constraint for deriving the contour candidate from the contour on the at least one source image.

4. The system of claim 1, wherein the at least one processor is further configured to map the ROI information, received via the user interface, to any one of predetermined anatomical groups based on natural language processing of the ROI information.

5. The system of claim 4, wherein the anatomical information comprises a contouring parameter related to a constraint for deriving the contour candidate from the contour on the at least one source image, and
   wherein the at least one processor is further configured to predict the contour candidate by applying the contouring parameter determined based on a classification of a first anatomical group to which the received ROI information is mapped.

6. The system of claim 3, wherein the at least one processor is further configured to:
   derive a pattern of contouring parameters applied according to the ROI information for each user by analyzing a pattern of contour candidates approved by the user; and
   predict a new contour candidate for a new target image by applying the pattern of contouring parameters, applied according to the ROI information for each user, to the new target image.

7. The system of claim 1, wherein the at least one processor is further configured to detect a contouring aid request event for the prediction of the contour candidate via the user interface, and
   wherein the relevance between at least one source image, on which the contour corresponding to the ROI information has been already drawn, and the target image is determined based on a type of contouring aid request event.

8. The system of claim 1, wherein the at least one processor is further configured to:
   provide a subsequent sequence, pre-designated for the contour candidate, to the user; and
   approve the contour candidate upon receiving pre-designated feedback on the subsequent sequence from the user.

9. A method for contouring a set of medical images, the method comprising:
   receiving, by at least one processor, medical image set including a plurality of medical images via a communication interface;
   receiving, by the at least one processor, region-of-interest (ROI) information as an object for drawing of a contour via a user interface;
   checking, by the at least one processor, whether a contour corresponding to the ROI information has been drawn on a target image currently displayed to a user;
   predicting, by the at least one processor, a contour candidate in the target image if the contour corresponding to the ROI information has not been drawn on the target image; and
   displaying, by the at least one processor, the contour candidate on the target image,
   wherein the contour candidate is predicted based on a relevance between a source image, on which a first contour corresponding to the ROI information has been already drawn, and the target image,
   wherein the contour candidate is predicted such that a deformation of the contour candidate from the first contour has been constrained based on anatomical information related to the ROI information, and
   wherein the deformation of the contour candidate from the first contour has been constrained based on a mechanical deformable property related to an anatomical classification of the ROI information.

10. The method of claim 9, further comprising mapping, by the at least one processor, the ROI information, received via the user interface, to any one of predetermined anatomical groups based on natural language processing of the ROI information.

11. The method of claim 9, wherein the anatomical information comprises a contouring parameter related to a constraint for deriving the contour candidate from the contour on the at least one source image,
   wherein the method further comprises deriving, by the at least one processor, a pattern of contouring parameters applied according to the ROI information for each user by analyzing a pattern of contour candidates approved by the user, and
   wherein the predicting comprises predicting the contour candidate for the target image by applying the pattern of contouring parameters, applied according to the ROI information for each user, to the target image.

12. The method of claim 9, further comprising detecting, by the at least one processor, a contouring aid request event for the prediction of the contour candidate via the user interface.

13. The method of claim 9, further comprising:
   providing, by the at least one processor, a subsequent sequence, pre-designated for the contour candidate, to the user; and
   approving, by the at least one processor, the contour candidate upon receiving pre-designated feedback on the subsequent sequence from the user.

* * * * *